United States Patent
Moon et al.

(10) Patent No.: US 8,719,525 B2
(45) Date of Patent: May 6, 2014

(54) STORAGE DEVICE WITH MANUAL LEARNING

(75) Inventors: John Edward Moon, Superior, CO (US); Karl L. Enarson, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/279,301

(22) Filed: Oct. 23, 2011

(65) Prior Publication Data
US 2012/0102281 A1    Apr. 26, 2012

Related U.S. Application Data

(63) Continuation of application No. 12/339,346, filed on Dec. 19, 2008, now Pat. No. 8,069,324.

(51) Int. Cl.
*G06F 12/00* (2006.01)

(52) U.S. Cl.
USPC .......................................................... 711/162

(58) Field of Classification Search
None
See application file for complete search history.

(56) References Cited

U.S. PATENT DOCUMENTS

| | | | |
|---|---|---|---|
| 6,934,802 B2 * | 8/2005 | Cornaby et al. | 711/113 |
| 2003/0200393 A1 * | 10/2003 | Cornaby et al. | 711/118 |
| 2007/0005889 A1 * | 1/2007 | Matthews | 711/118 |
| 2010/0100699 A1 * | 4/2010 | Caulkins | 711/171 |

* cited by examiner

*Primary Examiner* — Brian Peugh
(74) *Attorney, Agent, or Firm* — Cesari & Reed, LLP; Kirk A. Cesari

(57) ABSTRACT

In a particular embodiment, a system is disclosed that includes a controller to read data from and write data to a first storage medium. The controller is adapted to monitor logical block addresses (LBAs) of each read operation from the first storage medium and to selectively store files associated with the monitored LBAs that are less than a predetermined length at a second storage medium to enhance performance of applications associated with the LBAs.

20 Claims, 5 Drawing Sheets

STORAGE DEVICE WITH MANUAL LEARNING

CROSS-REFERENCE TO RELATED APPLICATION

The present application is a continuation of and claims priority of U.S. patent application Ser. No. 12/339,346 filed on Dec. 19, 2008.

FIELD

The present invention relates generally to a storage device with manual learning, and more particularly, but not by limitation to, a storage device having a controller adapted to preserve particular logical block addresses at a memory to enhance system performance.

DETAILED DESCRIPTION OF ILLUSTRATIVE EMBODIMENTS

In a particular embodiment, a controller is disclosed to read data from and write data to a first storage medium. The controller is adapted to monitor logical block addresses (LBAs) of each read operation from the first storage medium and to selectively store the monitored LBAs at a second storage medium to enhance performance of applications associated with the LBAs.

Figure 1:
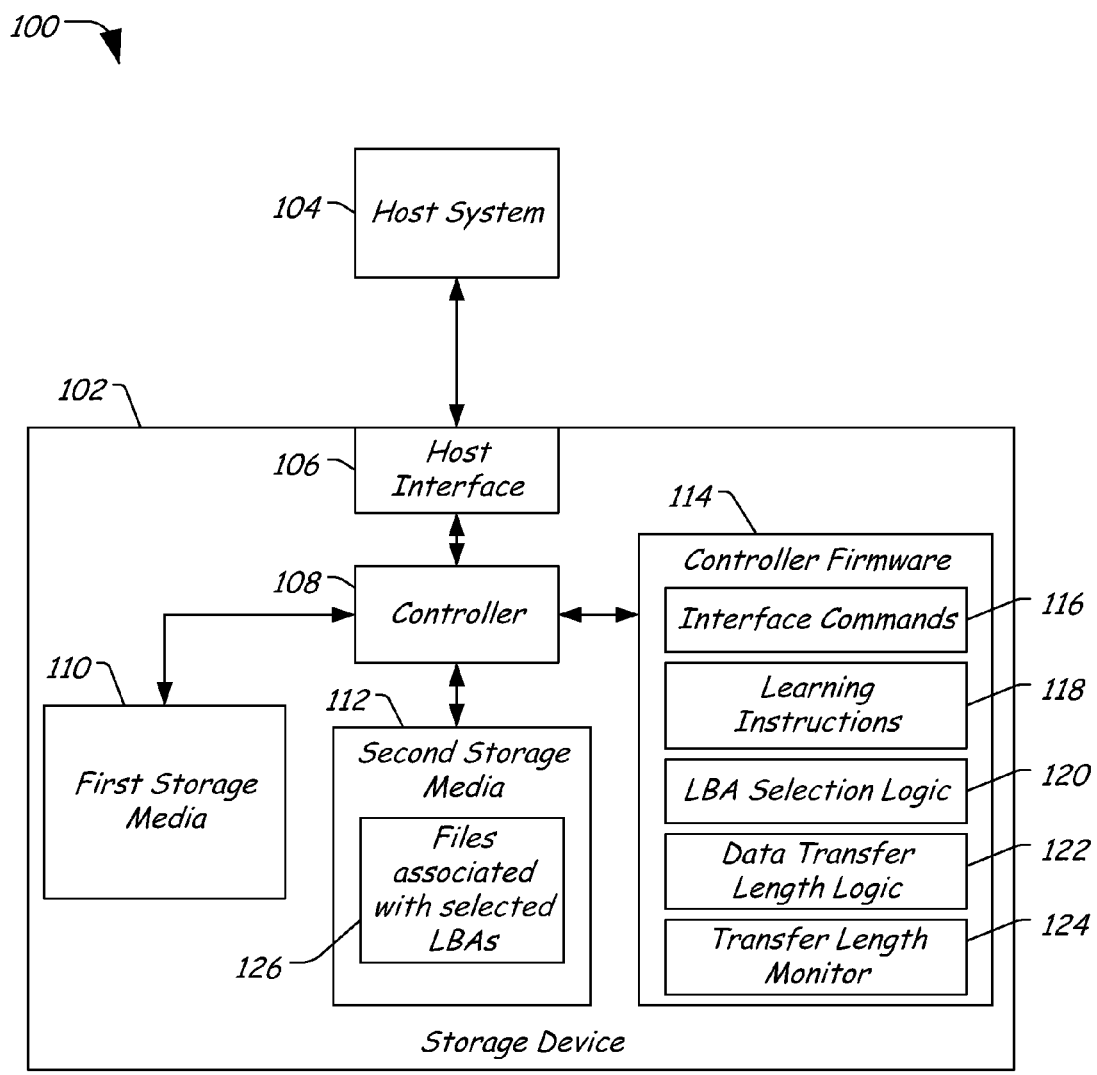
FIG. 1 is a block diagram of a particular illustrative embodiment of a system including a storage device having a controller with manual learning functionality.

FIG. 1 is a block diagram of a particular illustrative embodiment of a system 100 including a storage device 102 having a controller 108 with manual learning functionality. The storage device 102 is adapted to communicate with a host system 104. In a particular embodiment, the host system 104 can be a processor, a computer, mobile telephone, a personal digital assistant, another electronic device, or any combination thereof. The storage device 102 includes a host interface 106 that is adapted to send data to and receive data and data storage commands from the host system 104. The storage device 102 further includes a controller 108 that is coupled to the host interface 106. The controller 108 is adapted to control access to a first storage media 110, and to a second storage media 112. In a particular embodiment, the controller 108 can be a processor. The controller 108 is also coupled to controller firmware 114, which includes instructions that are executable by the controller 108 to perform a variety of storage device functions.

The firmware 114 includes interface command instructions 116, which may include a list of data storage and other interface commands that are executable by the controller 108. In a particular example, the list may be an exclusive list, such that the controller 108 is adapted to disregard interface commands that are not included in the list. The firmware 114 further includes learning instructions 118 that are executable by the controller 108 to monitor logical block addresses (LBAs) that are associated with data read requests received at the host interface 106. The firmware 114 also includes LBA selection logic 120 that is adapted to select particular LBAs from the monitored LBAs for storage of the associated files at the second memory 112 (as shown by files associated with the selected LBAs 126). Further, the firmware 122 includes data transfer length logic 122 that is executable by the controller 108 to determine a length of each data transfer and to compare the length to a specified (pre-determined) length. In a particular embodiment, the term "length" refers to the size of the data transfer. In a particular example, the length can refer to a size of a serial data transfer, a data transfer size for parallel transfer, or other similar data size dimensions. In a particular embodiment, the data transfer length logic 122 and the LBA selection logic 120 can cooperate to allow the controller 108 to select LBAs associated with data transfers of a specified length and to store files associated with the selected LBAs 126 at the second storage media 112.

In a particular example, if a gaming application is being executed by the host system 104, loading instructions related to different levels may consist of long sequential files and some short random files. In this particular example, the controller 108 can use the LBA selection logic 120 and the data transfer length logic 122 to select LBAs associated with only the short random files, which files often take the most time to load from the first storage media 110, and to store the selected short random files to the second storage media 112. Further, an address lookup table can be updated to associate the selected LBAs with the second storage media 112. By storing the short random files at the second storage media 112, level load performance can be enhanced.

In a particular embodiment, the controller 108 of the storage device 102 is adapted to automatically learn LBAs associated with frequently accessed application data stored in the first storage media 110 and to store files associated with the LBAs 126 at the second storage media 112 to enhance read performance of the host system 104. In a particular embodiment, the storage device 102 is responsive to one or more interface commands to initiate manual learning (i.e., to trigger execution of the learning instructions 118), to suspend or restart automatic learning modes, and to stop the manual learning.

In a particular example, applications written for the host system 104 can determine a set of LBAs that, if read from the second storage media 112, would provide a performance benefit for the associated application. The application may include instructions that can then utilize the manual learning interface commands to initiate manual learning via the learning instructions 118, which instructions cause the storage device 102 to enter a manual learning mode. While the storage device 102 is operating in the manual learning mode, the application can access the identified LBAs and the controller 108 can use the learning instructions 118 and the LBA selection logic 120 to manually learn the LBAs and to store the files associated with the selected LBAs 126 in the second storage media 112. In a particular embodiment, the first storage media 110 can be a disc data storage medium, and the second storage media 112 can be a solid-state storage device, such as a NAND flash memory device, a NOR flash memory device, another solid-state memory device, or any combination thereof. The storage device 102 can preserve the learned files associated with the LBAs 126 in the second storage medium 112 to provide improved application performance for subsequent loads. In a gaming example, the gaming application could initiate manual learning to set the storage device 102 into a manual learning mode and then read the files needed for the game levels when playing the game. The files for the various game levels would then reside in the second storage medium 112, reducing load time within the game and improving the user's experience.

In a particular embodiment, the manual learning mode of the storage device 102 causes the controller 108 to monitor all read operations and to store files associated with the monitored read operations (i.e., files associated with the LBAs 126) at the second storage medium 112. Further, the controller 108 can update an address lookup table such that the LBAs are associated with the second storage medium 112. In another particular embodiment, the controller 108 is adapted to select LBAs that are associated with data transfers having lengths that are smaller than a predetermined length.

Figure 2:
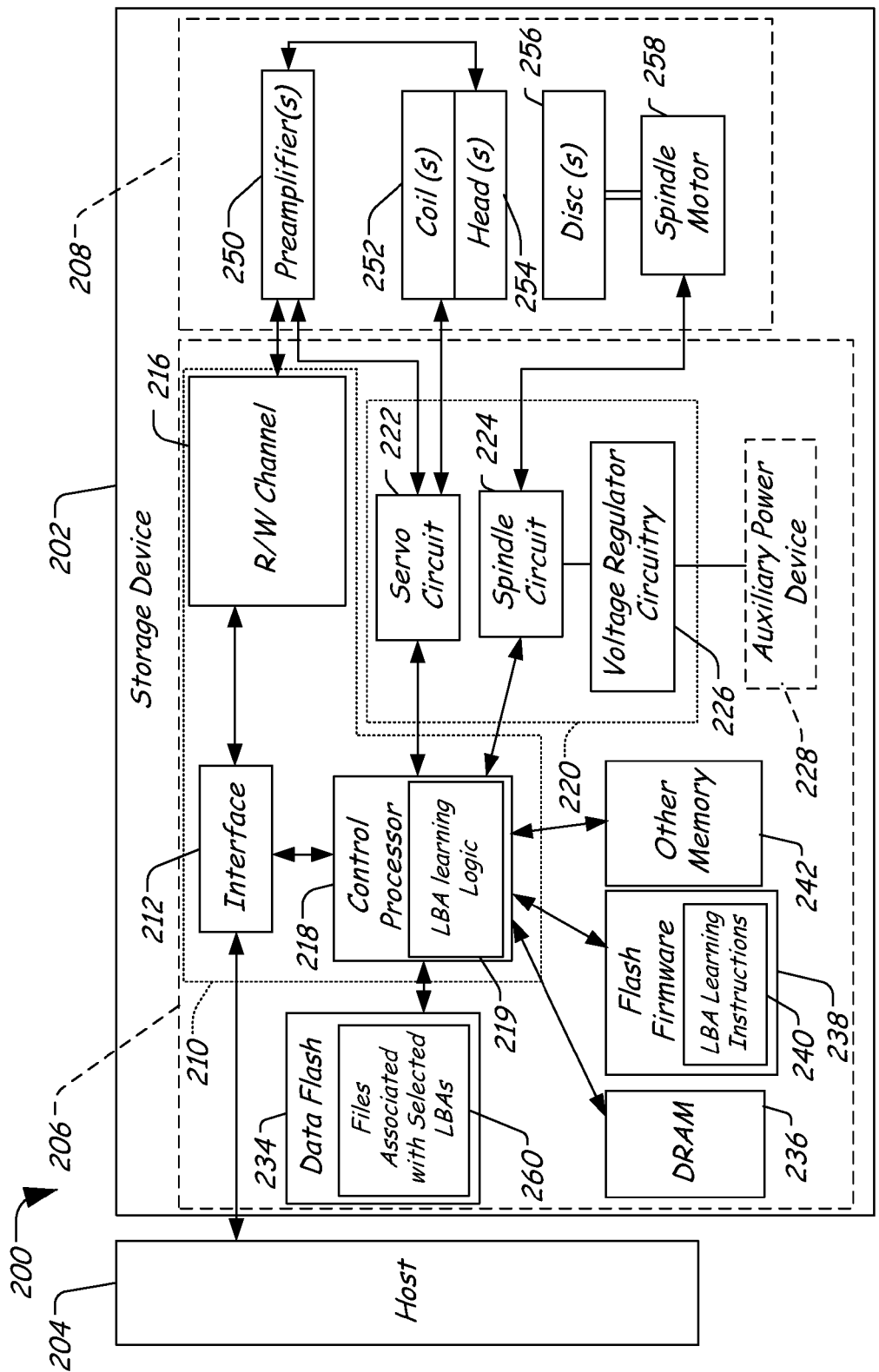
FIG. 2 is a block diagram of a particular illustrative embodiment of a system including a hybrid storage device having a controller adapted to provide manual learning functionality.

FIG. 2 is a block diagram of a particular illustrative embodiment of a system 200 including a hybrid storage device 202 including a controller (i.e., a control processor 218) adapted to provide manual learning functionality. As used herein, the term "hybrid storage device" refers to a storage device that includes a first storage media and a second storage media. In a particular embodiment, hybrid storage device may refer to a storage device that includes both solid-state and disc storage media. Further, as used herein, the term "solid-state storage media" refers to storage medium that utilizes semiconductor properties to represent data values and that has no moving parts to record or retrieve the data.

The hybrid storage device 202 includes both disc storage media (one or more discs 256) and solid-state storage media, such as a flash memory device (data flash 234, flash firmware 238, etc.). The hybrid storage device 202 is adapted to communicate with a host system 204. In a particular embodiment, the host system 204 can be a computer, a processor, a mobile telephone, a personal digital assistant (PDA), another electronic device, or any combination thereof. In a particular example, the hybrid storage device 202 can communicate with the host system 204 via a universal serial bus (USB), another type of communication interface, or any combination thereof. In another particular example, the hybrid storage device 202 can be a stand-alone device that is adapted to communicate with the host system 204 via a network, such as via a network cable using a networking protocol.

The hybrid storage device 202 includes recording subsystem circuitry 206 and a head-disc assembly 208. The recording subsystem circuitry 206 includes storage device read/write control circuitry 210 and disc-head assembly control circuitry 220. The recording subsystem circuitry 206 further includes an interface circuit 212, which includes a data buffer for temporarily buffering data received via the interface circuit 212 and which includes a sequencer for directing the operation of the read/write channel 216 and the preamplifier 250 during data transfer operations. The interface circuit 212 is coupled to the host system 204 and to a control processor 218, which is adapted to control operation of the hybrid storage device 202. In a particular embodiment, the control processor 218 includes logical block address (LBA) learning logic 219 that is adapted to monitor LBAs associated with read requests received at the interface 212 from the host system 204 to access data and/or applications stored at a first memory, such as one or more discs 256. The LBA learning logic 219 can selectively store files associated with the monitored LBAs 260 at a second memory, such as a flash memory 234 to enhance perceived performance of a host application executing on the host system 204. In a particular example, by storing the selected files at the flash memory 234, the load performance of the storage device 202 can be improved for particular applications. In a particular embodiment, the one or more discs 256 represent rotatable, non-volatile storage media.

The control processor 218 is coupled to a servo circuit 222 that is adapted to control the position of one or more read/write heads 254 relative to the one or more discs 256 as part of a servo loop established by the one or more read/write heads 254. The one or more read/write heads 254 can be mounted to a rotary actuator assembly to which a coil 252 of a voice coil motor (VCM) is attached. The VCM includes a pair of magnetic flux paths between which the coil 252 is disposed so that the passage of current through the coil 252 causes magnetic interaction between the coil 252 and the magnetic flux paths, resulting in the controlled rotation of the actuator assembly and the movement of the one or more heads 254 relative to the surfaces of the one or more discs 256. The servo circuit 222 is used to control the application of current to the coil 252, and hence the position of the heads 254 with respect to the tracks of the one or more discs 256.

The disc-head assembly control circuitry 220 includes the servo circuit 222 and includes a spindle circuit 224 that is coupled to a spindle motor 258 to control the rotation of the one or more discs 256. The hybrid storage device 202 also includes an auxiliary power device 228 that is coupled to voltage regulator circuitry 226 of the disc-head assembly control circuitry 220 and that is adapted to operate as a power source when power to the hybrid storage device 202 is lost. In a particular embodiment, the auxiliary power device 228 can be a capacitor or a battery that is adapted to supply power to the hybrid storage device 202 under certain operating conditions. In a particular example, the auxiliary power device 228 can provide a power supply to the recording subsystem assembly 206 and to the disc-head assembly 208 to record data to the one or more discs 256 when power is turned off. Further, the auxiliary power device 228 may supply power to the recording subsystem assembly 206 to record data to the data flash 234 when power is turned off.

Additionally, the hybrid storage device 202 includes the data flash memory 234, a dynamic random access memory (DRAM) 236, firmware 238 (such as a flash memory), other memory 242, or any combination thereof. In a particular embodiment, the firmware 238 is accessible to the control processor 218 and is adapted to store the LBA learning instructions 240.

In a particular embodiment, the control processor 218 is responsive to an "initiate manual learning" interface command received from the host system 204 via the interface 212 to load the LBA learning instructions 240 from the flash firmware 238 to the control processor 218 as illustrated by the LBA learning logic 219. The LBA learning logic 219 is executable by the control processor 218 to monitor LBAs associated with read access requests and to selectively store files associated with the monitored LBAs to the flash memory 234 (as indicated at 260). In a particular embodiment, control processor 218 is adapted to suspend monitoring of the LBAs when a defragmentation operation is being performed on the one or more discs 256 and to resume monitoring of the LBAs when the defragmentation operation is completed.

Figure 3:
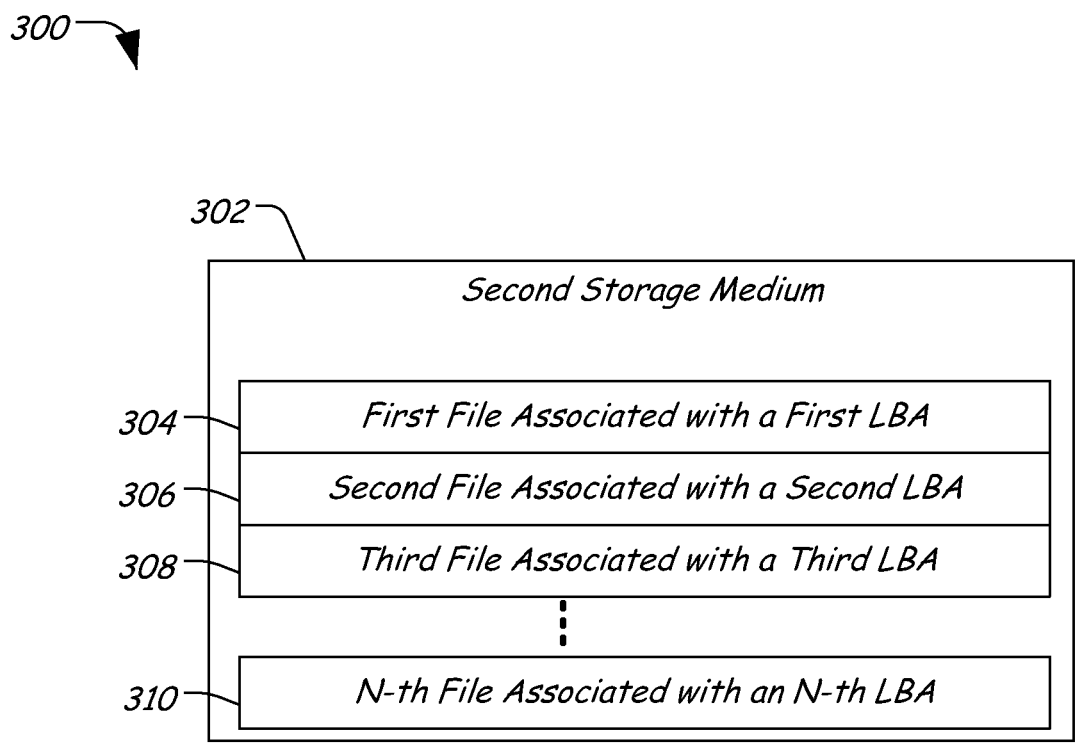
FIG. 3 is a block diagram of a particular illustrative embodiment of a system including a second storage media having a set of files associated with logical block addresses (LBAs)

FIG. 3 is a block diagram of a particular illustrative embodiment of a system 300 including a second storage media 302 having a set of files associated with logical block addresses (LBAs). The storage media 302 can include multiple files related to selected LBAs. In a particular example, the storage media 302 includes a first file associated with a first logical block address (LBA) 304, a second file associated with a second LBA 306, a third file associated with a third LBA 308 and an N-th file associated with an N-th LBA 310. In a particular embodiment, the second storage medium 302 can be a flash memory or other solid-state memory. Further, the second storage medium 302 can store any number of files associated with any number of LBAs. In a particular example, each of the files 304, 306, 308 and 310 stored at the second storage medium can have a file size that is less than a pre-determined size. In another particular example, each of the files 304, 306, 308, and 310 represent files associated with LBAs that were accessed while the controller was operating in a manual learning mode.

Figure 4:
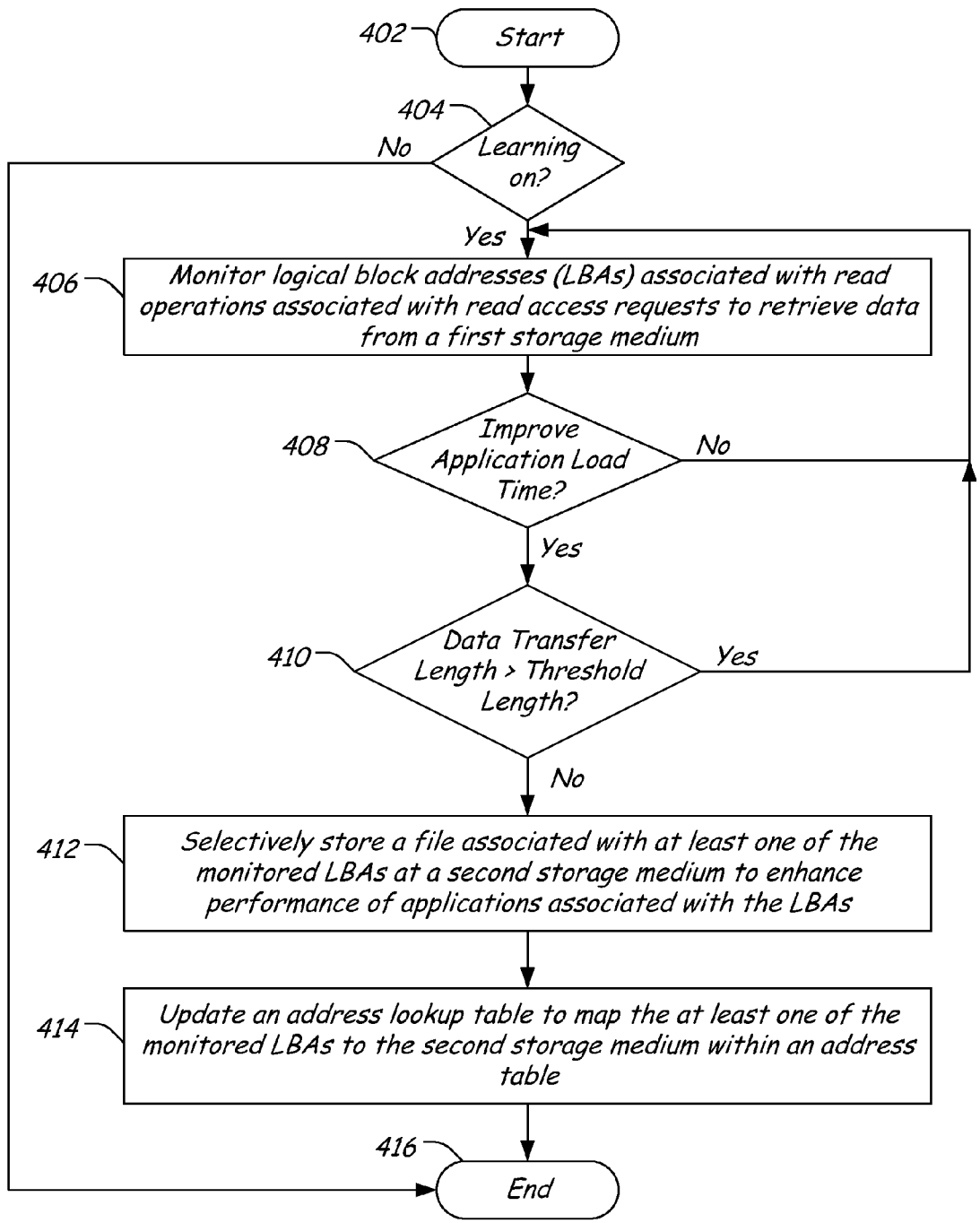
FIG. 4 is a flow diagram of a particular illustrative embodiment of a method of triggering manual learning at a storage device.
Figure 5:
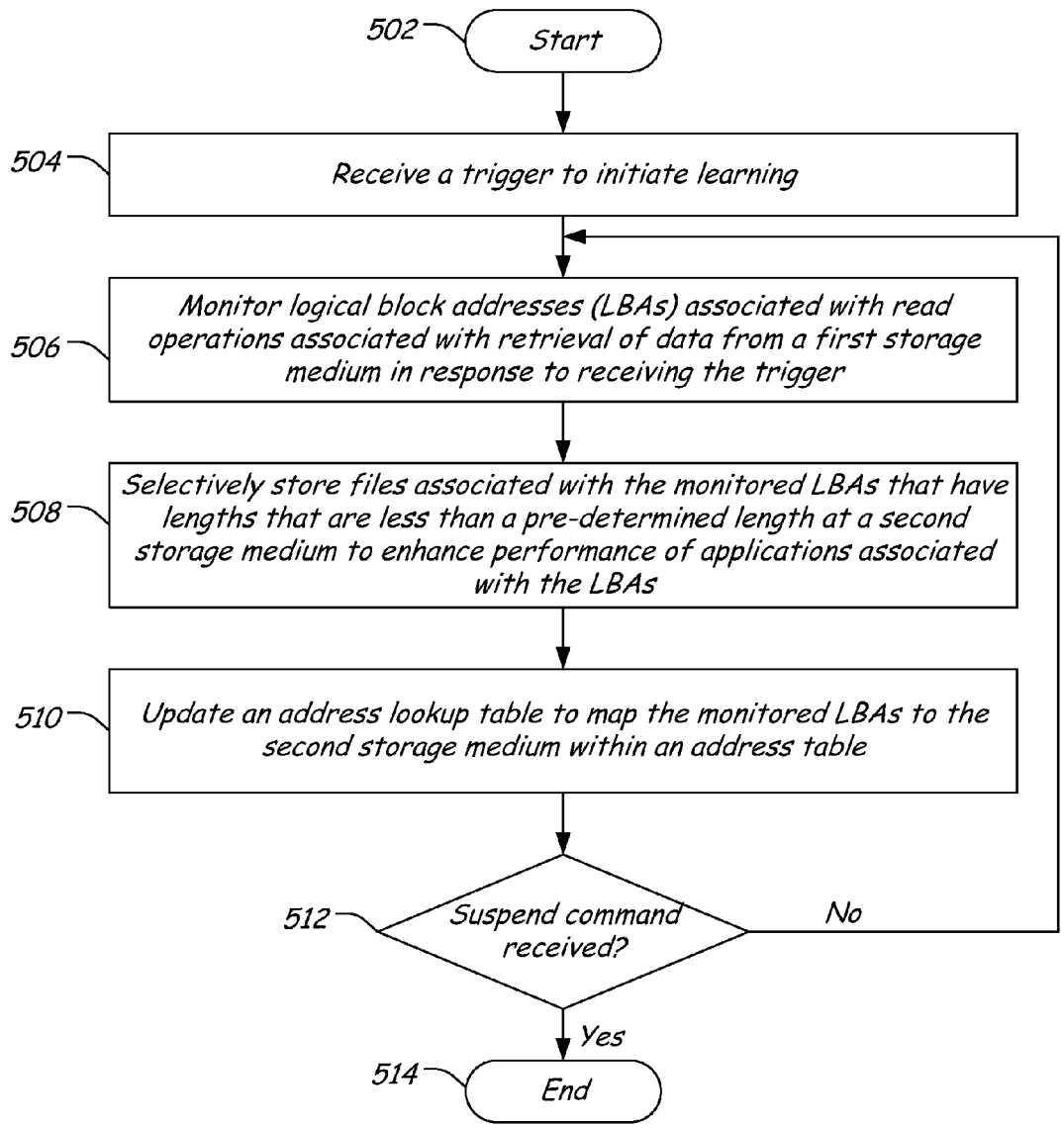
FIG. 5 is a flow diagram of a second particular illustrative embodiment of a method of triggering manual learning at a storage device.

FIGS. 4 and 5 below illustrate representative flow diagrams of particular examples of methods of manual learning in a storage device. It should be understood that the particular flow diagrams of FIGS. 4 and 5 are illustrative only, and are not intended to be limiting.

FIG. 4 is a flow diagram of a particular illustrative embodiment of a method of triggering manual learning at a storage device. The method begins at 402. At 404, if manual learning is not initiated, the method advances to 416 and is terminated. Returning to 404, if manual learning is activated, the method advances to 406 and the controller monitors logical block addresses (LBAs) associated with read access requests to retrieve data from a first storage medium. Continuing to 408, the controller evaluates the monitored LBA to determine if storage of the monitored LBA at a second storage medium would improve application load time. If such storage would not improve application load time, the method returns to 406, and the controller monitors logical block addresses (LBAs) associated with read access requests to retrieve data from a first storage medium. If application load time would be improved at 408, the method advances to 410 and the controller determines if the data transfer length is greater than a threshold length. If the data transfer length is greater than the threshold length, the method returns to 406, and the controller monitors logical block addresses (LBAs) associated with read access requests to retrieve data from a first storage medium.

Returning to 410, if the data transfer length is less than the threshold length, the method advances to 412 and the controller selectively stores a file related to at least one of the monitored LBAs at the second storage medium to enhance performance of applications associated with the LBAs. Proceeding to 414, an address lookup table is updated to map the at least one of the monitored LBAs to the second storage medium. The method terminates at 416.

FIG. 5 is a flow diagram of a second particular illustrative embodiment of a method of triggering manual learning at a storage device. The method begins at 502. At 504, a trigger is received to initiate learning. In a particular example, the trigger is a storage device command received at an interface of the storage device. In another particular embodiment, the trigger may be initiated by firmware operating on the storage device. In response to receiving a trigger, the controller can load and execute a logical block address (LBA) learning algorithm.

Advancing to 506, LBAs associated with read operations associated with retrieval of data from a first storage medium are monitored in response to receiving the trigger. Continuing to 508, files associated with the monitored LBAs that have lengths that are less than a pre-determined length are selectively stored at a second storage medium to enhance performance of applications associated with the LBAs. In a particular example, the storage device can monitor real-time storage device accesses to select LBAs and to store files associated with the selected LBAs into the second storage medium. In another particular embodiment, the storage device maintain a log file of file accesses and can selectively initiate manual learning to review the log file and to store files associated with selected LBAs into the second storage medium. Proceeding to 510, an address lookup table is updated to map the monitored LBAs to the second storage medium. Continuing to 512, if a suspend command is not received, the method returns to 506 and LBAs associated with read operations associated with retrieval of data from a first storage medium are monitored in response to receiving the trigger. Otherwise, if a suspend command is received at 512, the method is terminated at 514.

In conjunction with the systems and method disclosed above with respect to FIGS. 1-5, a storage device is disclosed that includes a controller that is adapted to enter a manual learning mode in response to a trigger (such as a manual learning interface command received from a host system, a manual learning process initiated by the controller, or any combination thereof). In the manual learning mode, the controller monitors logical block addresses (LBAs) associated with read requests, and selectively stores files associated with selected LBAs to a second storage media, such as a non-volatile solid-state memory device. In a particular embodiment, the selected LBAs are chosen based on a data transfer length. The files can be stored in the second storage media to improve performance of the storage device and to enhance perceived performance of applications operating on an associated host system.

In a particular example, the hybrid storage device can have first and second storage media. In a particular instance, the first storage media can be a disc storage media and the second storage media can be a non-volatile flash memory. In another particular instance, the first and second storage media may be solid-state storage media having different read/write characteristics. In a particular example, the second storage media can have faster read/write times than the first storage media, which may have a larger storage capacity, for example.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the storage system while maintaining substantially the same functionality without departing from the scope and spirit of the present invention. In addition, although the preferred embodiment described herein is directed to a storage system for manual learning of logical block addresses that includes a disc storage media and a non-volatile solid-state storage media, it will be appreciated by those skilled in the art that the teachings of the present invention can be applied to other storage systems that include first and second storage media having different read/write performance parameters, without departing from the scope and spirit of the present invention.

What is claimed is:
1. A system comprising:
  a controller adapted to:
    monitor logical block addresses (LBAs) for operations associated with a first data storage medium;

determine a length of a data transfer operation intended for the first data storage medium; and selectively store data associated with particular LBAs of the data transfer operation to a second data storage medium when the length is less than a threshold length.

2. The system of claim 1 further comprising the operations include access operations and the controller is further adapted to automatically determine LBAs associated with frequently accessed data stored in the first data storage medium and to store data associated with such LBAs at the second data storage medium.

3. The system of claim 1 further comprising the controller adapted to determine when a particular LBA of the monitored LBAs can be stored at the second storage medium to enhance performance of a host system based on a learning algorithm and to selectively store the particular LBA based on the determination.

4. The system of claim 1 further comprising the system is responsive to one or more commands received externally to the system to initiate a manual learning mode that includes determining when a particular LBA of the monitored LBAs can be stored at the second storage medium to enhance performance of another system and to selectively store the particular LBA based on the determination.

5. The system of claim 4 further comprising the system is responsive to one or more commands received externally to the system to stop the manual learning mode.

6. A method comprising:
monitoring logical block addresses (LBAs) of data transfer operations associated with a first data storage medium;
determining a length of a specific data transfer operation intended for the LBAs of the first data storage medium; and
storing data associated with the LBAs corresponding to the specific data transfer operation to a second data storage medium when the length is less than a threshold length.

7. The method of claim 6 further comprising automatically determining logical block addresses (LBAs) associated with frequently accessed application data stored in the first data storage medium and storing files associated with the LBAs at the second data storage medium.

8. A method comprising initiating a manual learning mode performed by a processor in response to a received command, the manual learning mode including determining when a particular logical block address (LBA) of a monitored data transfer operation can be stored at a specific storage medium to enhance performance of a system.

9. A device comprising:
a controller adapted to initiate a manual learning mode in response to a received command, the manual learning mode including determining when a particular logical block address (LBA) of monitored data transfer operations can be stored at an alternate storage medium to enhance performance of another system.

10. The device of claim 9 further comprising:
a host interface responsive to a host system;
a first storage medium to store user data and applications executable by the host system; and
a second storage medium comprising the alternate storage medium.

11. The device of claim 9, further comprising the controller is adapted to:
receive a command from a host system via a host interface;
initiate the manual learning mode in response to the received command; and
selectively store files associated with the monitored LBAs to the alternate storage medium.

12. The device of claim 9 further comprising the controller is adapted to stop monitoring the LBAs in response to receiving a command.

13. The device of claim 9, wherein the command may be received from an application of a host computer system and the application can include instructions that can utilize the command to initiate the manual learning mode.

14. The device of claim 9 further comprising the manual learning mode causes the controller to monitor read operations from a first storage medium and to store files associated with the monitored read operations at the alternate storage medium when the read operations have lengths that are smaller than a threshold length.

15. The device of claim 9 further comprising the controller adapted to:
automatically identify LBAs that are frequently accessed at a first storage medium; and
selectively store files associated with the identified LBAs at the alternate storage medium.

16. The device of claim 9 further comprising the controller adapted to:
evaluate LBAs to determine if storage of the LBAs at the alternate medium would improve an application load time; and
selectively store LBAs to the alternate medium based on the evaluation.

17. The device of claim 16 wherein the controller is a data storage controller of a data storage device and the application is a software application of a host computer connectable via an interface to the data storage device.

18. An apparatus comprising:
a controller adapted to:
monitor logical block addresses (LBAs) corresponding to data transfer operations associated with a first data storage medium; and
selectively store data associated with a monitored LBA to a second data storage medium when a length of a data transfer associated with the monitored LBA is less than a threshold length.

19. The apparatus of claim 18 further comprising the controller is responsive to a command to initiate a manual learning mode that includes determining when a particular LBA of the LBAs can be stored at the second data storage medium to enhance performance of an external system and to selectively store the particular LBA based on the determination.

20. The apparatus of claim 18 further comprising the controller adapted to:
evaluate the data transfer operations to determine if storage of specific data associated with the LBAs at the second data storage medium would improve an application load time; and
selectively store the specific data to the second data storage medium based on the evaluation.

* * * * *